United States Patent [19]
Yatsu

[11] Patent Number: 5,696,817
[45] Date of Patent: Dec. 9, 1997

[54] APPARATUS AND METHOD FOR DETERMINING THE SOURCE OF A TELEPHONE COMMUNICATION

[75] Inventor: Hiroyuki Yatsu, Tokyo, Japan

[73] Assignee: Canon Kabushiki Kaisha, Tokyo, Japan

[21] Appl. No.: 987,135

[22] Filed: Dec. 8, 1992

[30] Foreign Application Priority Data

Dec. 9, 1991 [JP] Japan ................ 3-350030

[51] Int. Cl.$^6$ .................................. H04M 3/02
[52] U.S. Cl. ................ 379/252; 379/373; 379/375; 370/384
[58] Field of Search ................ 379/251, 375, 379/252, 290, 373, 157, 156, 159, 164, 142, 279, 257, 127, 32, 1, 93, 94; 370/384

[56] References Cited

U.S. PATENT DOCUMENTS

| | | | |
|---|---|---|---|
| 4,107,477 | 8/1978 | Morrison | 379/164 |
| 4,477,697 | 10/1984 | Judd et al. | 379/375 |
| 4,958,369 | 9/1990 | Tsuchida | 379/157 |
| 5,001,709 | 3/1991 | Satoh | 370/92 |
| 5,008,884 | 4/1991 | Yazaw et al. | 379/93 |
| 5,034,948 | 7/1991 | Mizutani et al. | 370/110.1 |
| 5,073,922 | 12/1991 | Okada | 379/173 |
| 5,142,571 | 8/1992 | Suzuki et al. | 379/32 |
| 5,214,692 | 5/1993 | Chack et al. | 379/32 |

FOREIGN PATENT DOCUMENTS 2150147 6/1990 Japan.

OTHER PUBLICATIONS

Teleconnect Magazine, "TLE/Communications' EXEL-2—A KSUless System, Folks" by Ed Leibowitz, Sep. 89, pp. 127–129.
Telephony Magazine advertizement "New Products and Services",Sep. 15, 1986, p.90.

*Primary Examiner*—Ahmad F. Matar
*Attorney, Agent, or Firm*—Morgan & Finnegan, L.L.P.

[57] ABSTRACT

A communication apparatus in accordance with the present invention determines the origin of an incoming telephone communication based on the calling party's number. When a call is made to a communication line to which an apparatus of the present invention is connected, the apparatus determines the number of digits in the calling party's number, and uses a ringing pattern or tone to indicate the source of the incoming call to the called party.

7 Claims, 13 Drawing Sheets

APPARATUS AND METHOD FOR DETERMINING THE SOURCE OF A TELEPHONE COMMUNICATION

BACKGROUND OF THE INVENTION

This invention relates to a digital terminal apparatus and communication method and, more particularly, to a digital terminal apparatus and a communication method using a digital communication line.

Along with the development in service of a digital public network (hereinafter referred to as "ISDN"), various digital terminal apparatuses such as a telephone exchange unit and digital telephone apparatus capable of accommodating an ISDN as an outside line have been utilized. In this case, an interface between the ISDN and terminal apparatus is defined as a T reference point interface in CCITT.

On the other hand, a private branch exchange (hereinafter referred to as "PBX") having an extension interface to accommodate a digital terminal apparatus for the ISDN has been also utilized. This type of extension interface is defined as an S reference point interface in CCITT.

The specification of the T reference point interface is basically same as that of the S reference point interface. Accordingly, in a case where an extension line for the digital terminals (hereinafter referred to as "S reference point extension") is connected to the digital terminal such as a digital telephone apparatus or key telephone system, they can be connected regardless of the type of communication line.

Furthermore, in a conventional analog communication line, when the telephone apparatus seizes a communication line, a dial tone which can be heard by a user before dialing is outputted from the exchange unit. But the terminal apparatus originally generates a ringing tone in a digital communication line since a logical connection with the line has not been made yet.

Furthermore, in the case of an analog communication line, a ringing tone at an incoming call is generated to correspond to a call signal pattern from the analog line by the terminal apparatus. On the other hand, in the case of a digital communication line, the terminal apparatus generates the tone.

Still further, the conventional digital terminal apparatus outputs a dial tone, in case of a connection to either the ISDN or S reference point of the PBX, and a ringing tone, or in case of an incoming call from the ISDN or S reference point of the PBX. Since the same tones are outputted when the user processes an outgoing call or responds to an incoming call, it is difficult to judge what type of communication line has been seized or to which communication line the incoming call has arrived.

Accordingly, in a case where an outgoing call is made to a third party who subscribes to the ISDN which seizes the S reference point of the PBX, a trunk access code needs to be added before a subscriber's number in order to be called. Accordingly, there is an inconvenience that a called party may be mistakenly identified by the calling party since it is difficult to judge what type of communication line is seized among the ISDN, S reference point of the PBX, and the like.

SUMMARY OF THE INVENTION

Accordingly, it is an object of the present invention to provide a digital terminal apparatus capable of discriminating the type of network from a dial tone and/or ringing tone.

According to the present invention, the foregoing object is attained by providing a digital terminal apparatus connected to a digital communication line comprising: setting means for setting the type of digital communication line to be connected; and dial tone generation means for generating a unique dial tone based on the type of communication line set by the setting means, when a call is made.

According to the present invention, the foregoing object is attained by providing a digital terminal apparatus connected to a digital communication line comprising: setting means for setting the type of digital communication line to be connected; and ringing tone generation means for generating a unique ringing tone based on the type of communication line set by said setting means, in a case where an incoming call from the digital communication line is detected.

According to the present invention, the foregoing object is attained by providing a digital terminal apparatus connected to a digital communication line comprising: setting means for setting the first type of a digital communication line to be connected; tone generation means for transmitting a unique dial tone based on the type of communication line set by the setting means when a call is made, and generating a unique ringing tone based on the type of communication line set by the setting means, in a case where an incoming call from the digital communication line is detected.

It is another object of the present invention to provide a digital terminal apparatus capable of discriminating an extension line from an outside line based on a ringing tone.

According to the present invention, the foregoing object is attained by providing a digital terminal apparatus connected to a digital communication line comprising: discrimination procedure setting means for setting a discrimination procedure in advance so as to discriminate whether a calling party is on an outside line or an extension line based on the calling party's number included in a setup message, in a case where a connected digital communication line is an extension line for a digital terminal of an exchange unit conforming to an S reference point interface according to CCITT Recommendation and there is an incoming call for the extension line from the digital communication line of the exchange unit; and ringing tone generation means for discriminating whether a calling party is on an outside line or an extension line based on the discrimination procedure set by the discrimination procedure setting means and the received calling party's number, and generating a ringing tone in accordance with the discriminated line of the calling party.

It is still another object of the present invention to provide a communication method capable of discriminating the type of communication network from a dial tone and ringing tone.

According to the present invention, the foregoing object is attained by providing a communication method using a digital communication line comprising: a setting step of setting the type of a digital communication line to be connected; a dial tone generating step of generating a unique dial tone based on the type of communication line set by the setting step when a call is made; and a ringing tone generation step of generating a ringing tone corresponding to the type of communication line, in the case where the incoming call from the digital communication line is detected.

It is still another object of the present invention to provide a communication method capable of discriminating an extension line from an outside line based on a ringing tone.

According to the present invention, the foregoing object is attained by providing a communication method using a digital communication line comprising: a discrimination procedure setting step of setting a discrimination procedure in advance so as to discriminate whether a calling party is on an outside line or an extension line based on the calling party's number included in a setup message, in a case where a connected digital communication line is an extension line for the digital terminal conforming to an S reference point interface and there is an incoming call from the extension line for the digital terminal; a discrimination step of discriminating whether the calling party is on the outside line or extension line based on the discrimination procedure set by the discrimination procedure setting step and the received calling party's number when there is an incoming call from the extension for the digital terminal; and a ringing tone generation step of generating a different ringing tone from other ringing tones in accordance with the calling party discriminated.

It is another object of the present invention to provide a digital terminal apparatus capable of indicating a power supply state when a call is made.

According to the present invention, the foregoing object is attained by providing a digital terminal apparatus comprising: power failure detection means for detecting a power failure; and dial tone generation means for generating a dial tone corresponding to either a power supply state or power failure state based on the power state detected by the power failure detection means, when a call is made.

It is another object of the present invention to provide a digital terminal apparatus capable of indicating a power supply state when an incoming call arrives.

According to the present invention, the foregoing object is attained by providing a digital terminal apparatus comprising: power failure detection means for detecting a power failure; and ringing tone generation means for generating a ringing tone corresponding to either a power supply state or power failure state based on the power state detected by the power failure detection means, when an incoming call arrives.

In accordance with the present invention as described above, a user can be informed of what type of communication line is used by the dial tone or ringing tone which differs based on the type of communication line, such as ISDN or extension of the digital terminal, at the outgoing call made from the terminal apparatus or incoming call to the terminal apparatus. Also, a user can be informed of a power supply state, when she/he makes a call and an incoming call arrives.

The invention is particularly advantageous since the type of connected communication apparatus can be easily discerned by the user, thus providing a user friendly terminal apparatus.

Furthermore, according to the present invention, when there is an incoming call to the terminal apparatus, whether the call is from an outside line or an extension line it is discriminated based on a setup message and the user can easily discern the type of communication line used by the incoming call, thus providing a user friendly terminal apparatus.

Furthermore, according to the present invention, a user can be informed of a power supply state by a ringing tone and dialing tone, thus providing a user friendly terminal apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Three embodiments are described below.

[First Embodiment]

<Description for Operation Environment and General Description for the Apparatus (FIGS. 1–2)>

Figure 1:
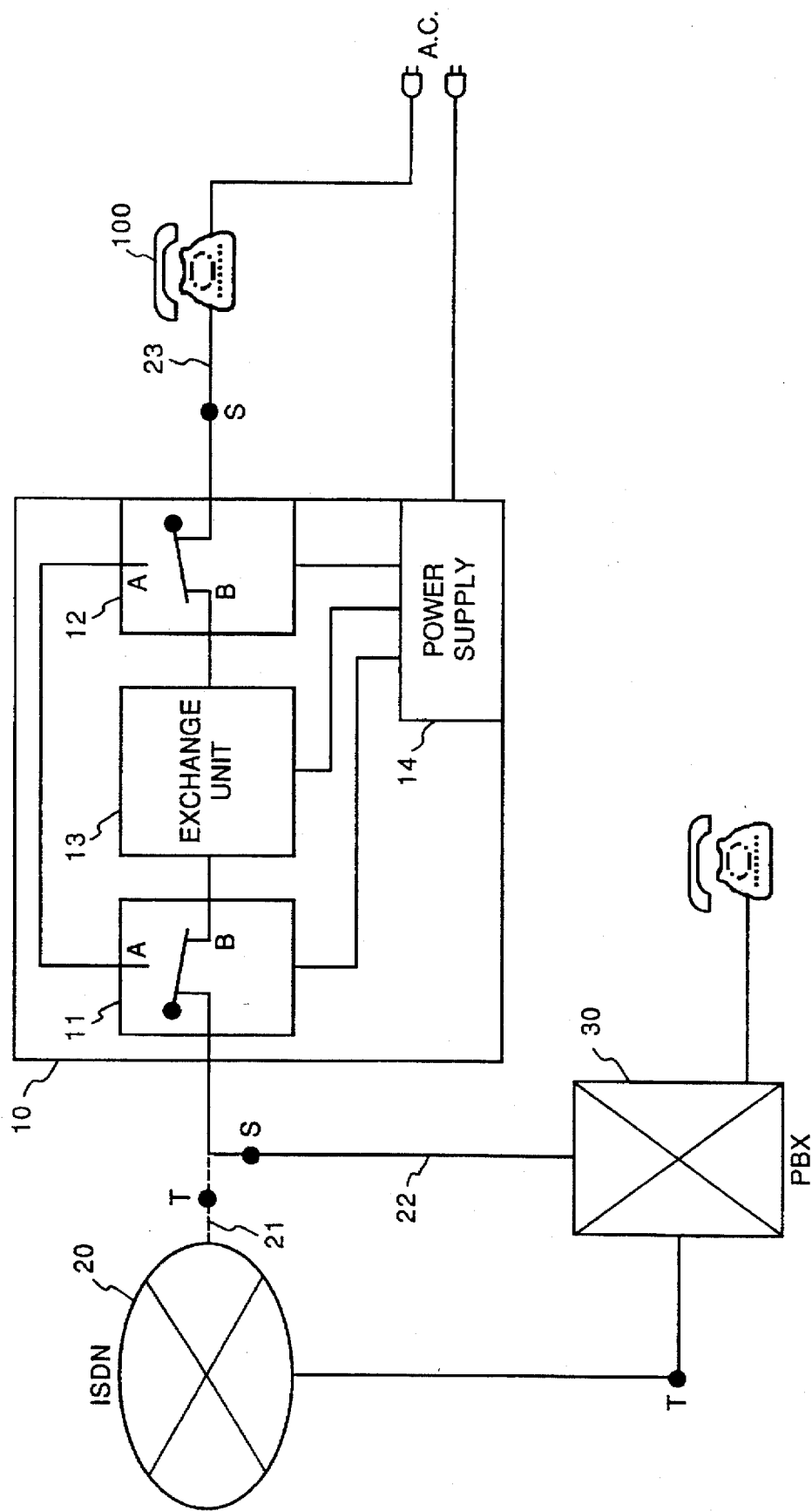
FIG. 1 is a block diagram illustrating an operational environment of the digital telephone apparatus of the first embodiment according to the present invention.

FIG. 1 is a block diagram illustrating an operational environment of the digital telephone apparatus. As shown in FIG. 1, a digital telephone apparatus 100 connects to a PBX 30 capable of dealing with a digital communication through a telephone exchange unit 10. In this connection, the digital telephone apparatus 100 can communicate with either a telephone apparatus of the extension line or an outside line via the PBX 30. Also, the digital telephone apparatus 100 can connect to an ISDN 20 without the PBX 30, as shown in the broken line of FIG. 1. In this connection, the digital telephone apparatus 100 can communicate with a telephone apparatus of an outside line via the ISDN 20.

The telephone exchange unit 10 comprises a switching circuit 11 provided in an interface for the ISDN or PBX, exchange unit 13 which exchanges communication lines, switching circuit 12 provided in an interface for the telephone apparatus 100, and power supply unit 14.

When power is normally supplied to each unit from the power supply unit 14, an I/O signal to the switching circuits 11 and 12 is performed through the exchange unit 13. On the other hand, at a power failure, each switch in the switching circuits 11 and 12 is changed over to the terminal A as shown in FIG. 1. The exchange unit 13 is bypassed and the digital telephone apparatus 100 is directly connected to the digital communication network side (a digital communication line 21 to the ISDN 20 or the digital communication line 22 to the PBX 30). The power is supplied to the digital telephone apparatus 100 from the digital communication network itself, when the power supply is shut down.

The power can be also supplied by an internal back-up power supply unit such as a battery cell in the digital telephone apparatus 100.

Figure 2:
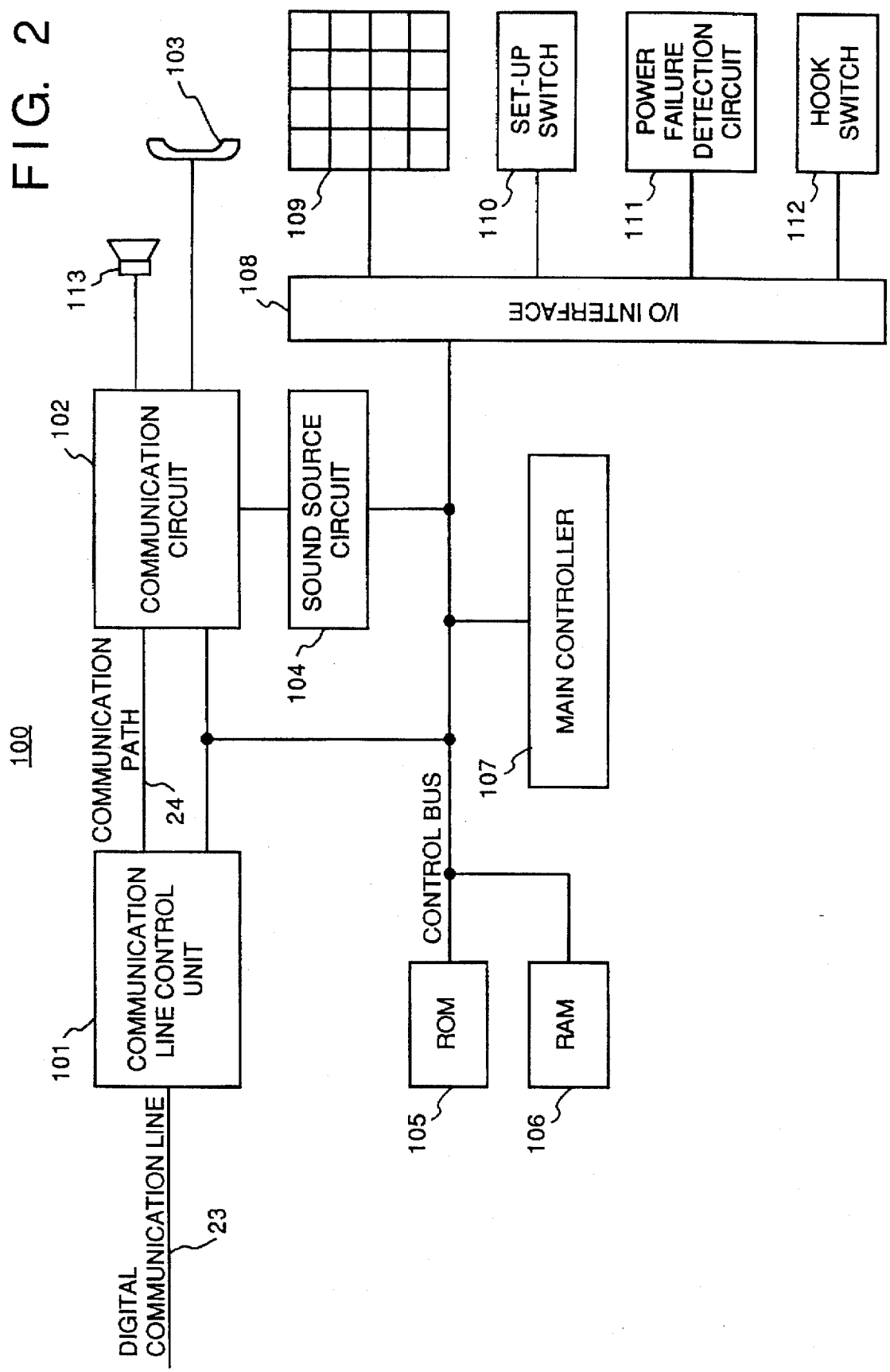
FIG. 2 is a block diagram illustrating a construction of the digital telephone apparatus of the first embodiment.

FIG. 2 is a block diagram illustrating a construction of the digital telephone apparatus 100 according to the present embodiment. The digital telephone apparatus 100 comprises a communication line control unit 101 for controlling connection between the digital communication line 23 and communication path 24, communication circuit 102 including a switching circuit for switching over between the communication path 24 and sound source circuit 104 or the handset 103 and speaker 113, handset 103 for communication, speaker 113 for an on-hook communication and sounding a ringing tone, sound source circuit 104 for generating a dial tone, a ringing tone, and the like, ROM 105 for storing control programs, RAM 106 for storing various data, main controller 107 for controlling the overall telephone apparatus, key input unit 109 for operating various keys for dialing, set-up switch 110 such as a slide switch for setting data for the type of communication line, power failure detection circuit 111 for detecting a power failure by supervising a power circuit (not shown), hook switch 112 for seizing/disconnecting a line by on-hook/off-hook operating of the handset 103, and I/O interface 108 for controlling an I/O signal to the power failure detection circuit 111 and hook switch 112.

The digital telephone apparatus 100 can set up a dial tone pattern for an outgoing call by the set-up switch 110 in accordance with the type of communication network to be connected at the installment. The type of communication network is defined by the interface of the network. In other words, the interface is either T reference point from the ISDN 20 or S reference point from the PBX in this embodiment. The setting at the power failure can differ from that at the normal power supply state in the set-up switch 110. In the case of the present embodiment, when the power failure state is detected by the power failure detection circuit 111, a dial tone which is different from the tone at the normal power supply is outputted to the handset 103 or the speaker 113 via the communication circuit 102 in accordance with the setting of the set-up switch 110. For the incoming call, the set-up switch 110 can be operated so as to output a distinguishable ringing tone between the case of power failure and power supply in accordance with the type of communication line.

In the above construction of the digital telephone 100, the processing for dial tone output and ringing tone are below described.

<Processing for Dial Tone Output (FIGS. 3–4)>

Figure 3:
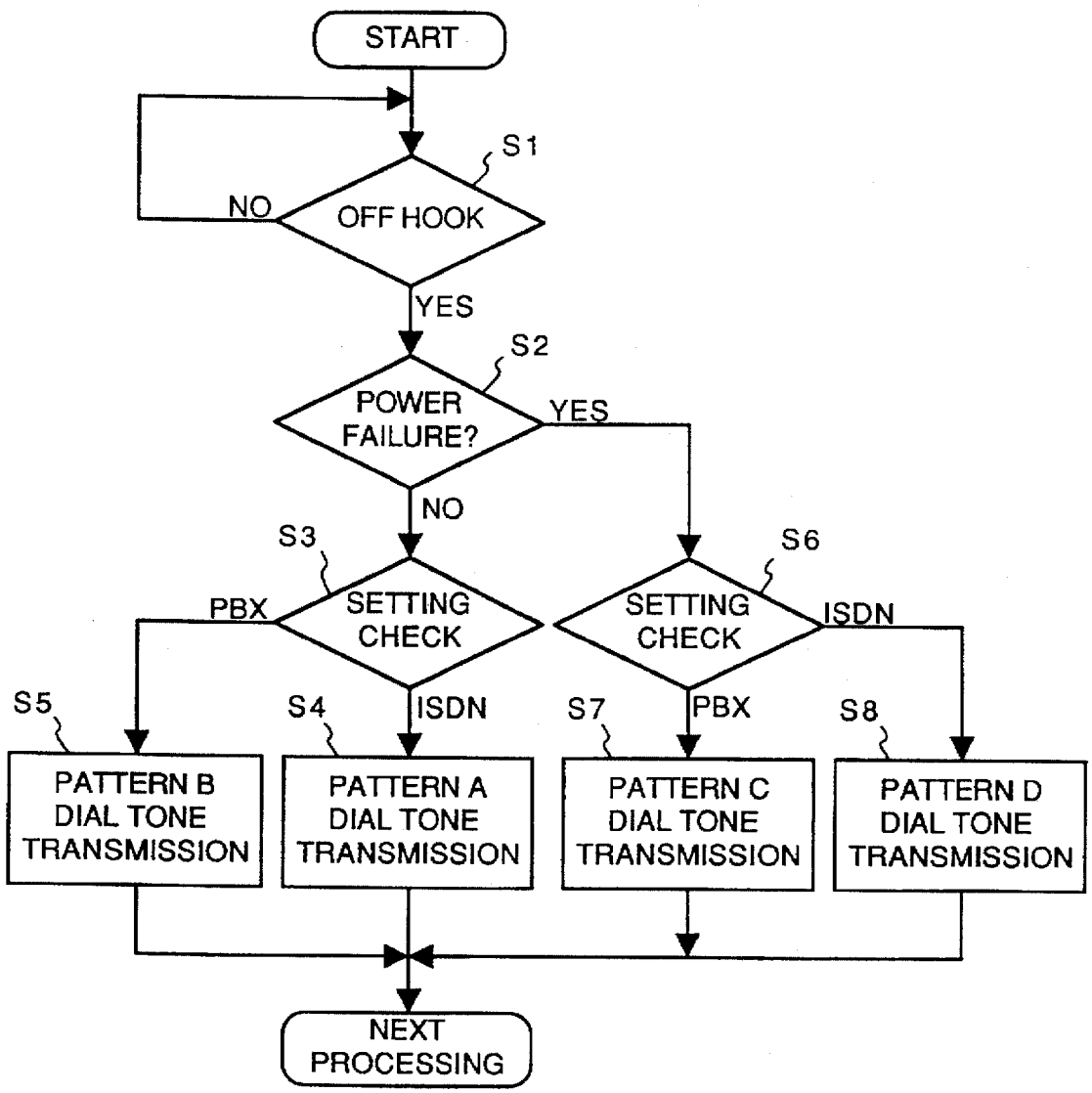
FIG. 3 is a flowchart illustrating an operation for dial tone selection when an outgoing call is made from the digital telephone apparatus of the first embodiment.

FIG. 3 is a flowchart illustrating an operation for dial tone selection.

At step S1, it is judged whether or not the handset 103 is hooked off or the hook switch 112 is pressed to be at the off-hook state. If the off-hook state is detected, the process proceeds to step S2, while if the off-hook state is not detected, the main controller 107 continues supervising to detect it. At step S2, the power failure detection circuit 111 is checked to judge whether or not the state is at the power failure state. If the power is normally supplied, the process proceeds to step S3. On the other hand, if the power failure is detected, the process proceeds to step S6.

Figure 4:
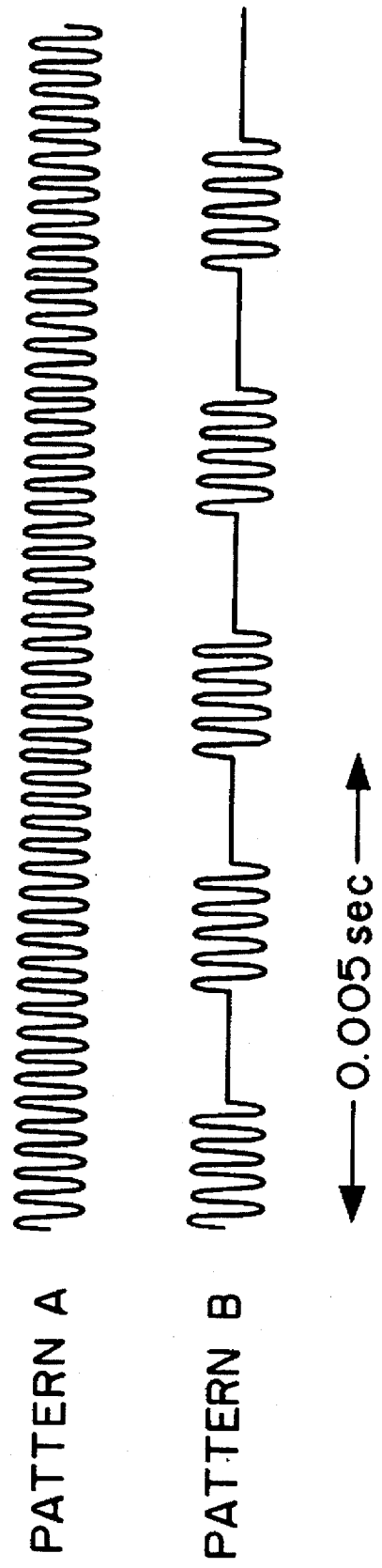
FIG. 4 is a waveform illustrating a pattern of the dial tone of the digital telephone apparatus of the first embodiment.

At step S3, a setting of the set-up switch 110 is checked at the power supply. If the connected digital line is the ISDN 20, the process proceeds to step S4 where the dial tone of the pattern A as shown in FIG. 4 is generated by the sound source circuit 104. On the other hand, if the connected digital line is an extension of the PBX 30, the process proceeds to step S5 where the dial tone of the pattern B as shown in FIG. 4 is generated by the sound source circuit 104.

At step S6, a setting of the set-up switch 110 is checked at the power failure. If the connected digital line is the ISDN 20, the process proceeds to step S8 where the dial tone of the pattern D (not shown), which is different from other dial tones at the power supply state, is generated from the sound source circuit 104. On the other hand, if the connected digital line is an extension of the PBX 30, the process proceeds to step S7 where the dial tone of the pattern C (not shown), which is different from other dial tones at the power supply, is generated by the sound source circuit 104.

After the processing at steps S4, S5, S7, and S8, the process proceeds to dialing the party to be called.

<Processing for Ringing Tone Output (FIGS. 5–6)>

Figure 5:
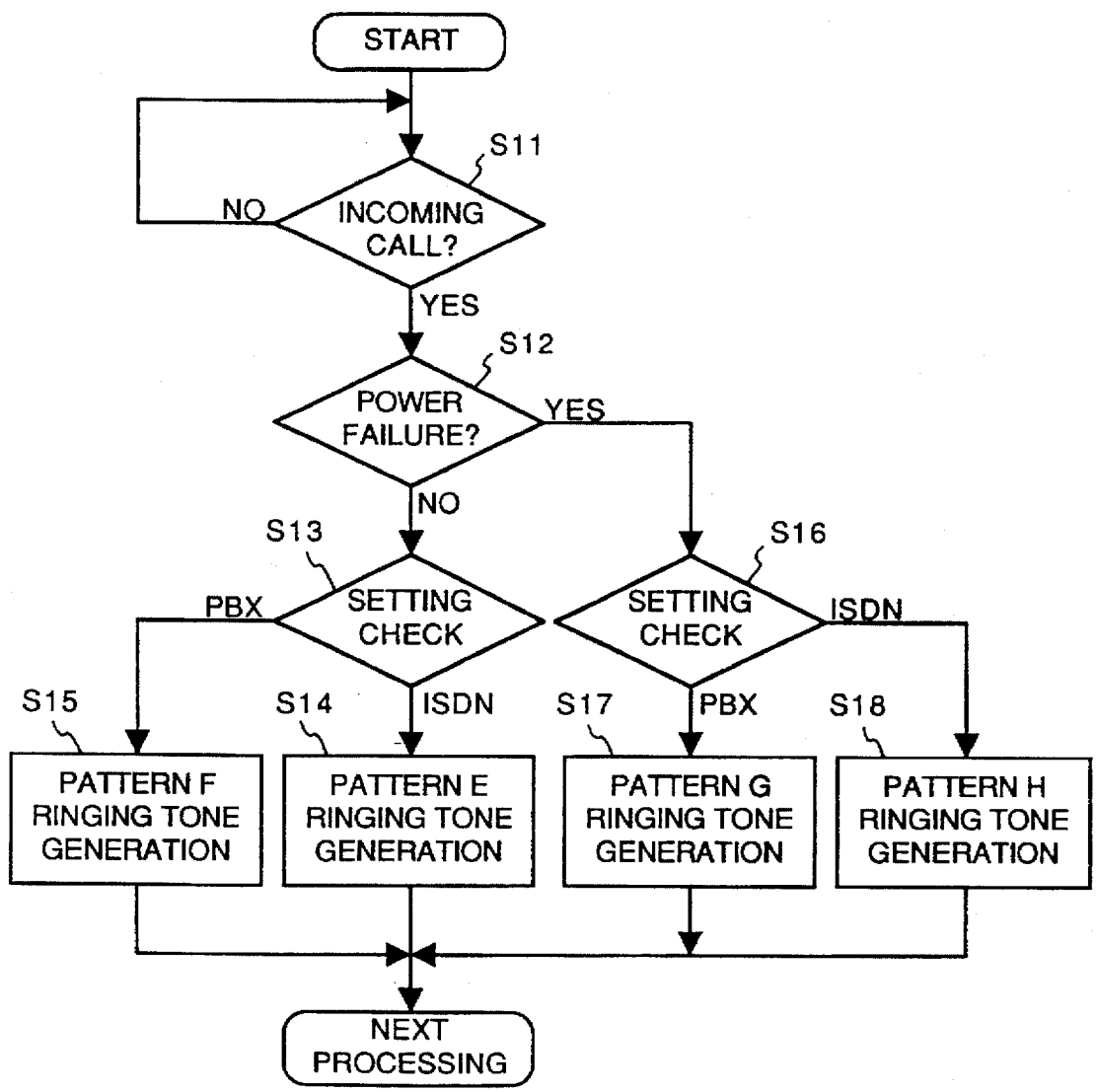
FIG. 5 is a flowchart illustrating an operation for a ringing tone selection when there is an incoming call to the digital telephone apparatus of the first embodiment.
Figure 6:
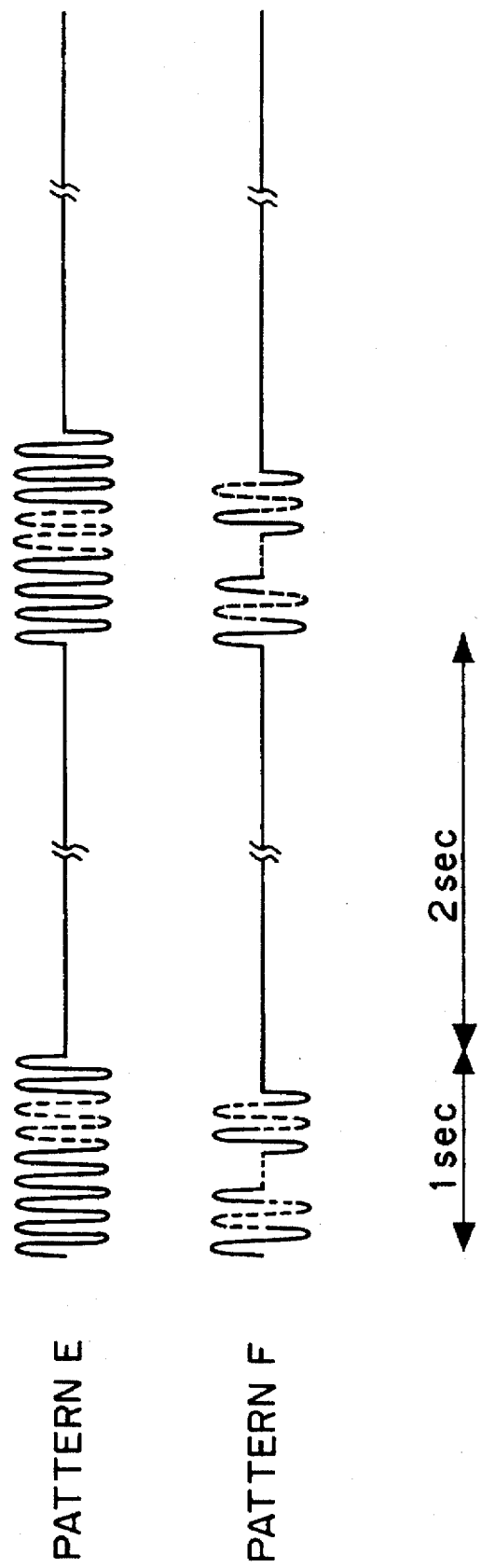
FIG. 6 is a waveform illustrating a pattern of the ringing tone in the digital telephone apparatus of the first embodiment.

FIG. 5 is a flowchart illustrating an operation for ringing tone selection when there is an incoming call to the digital telephone apparatus. FIG. 6 is a waveform illustrating a pattern of a ringing tone.

At step S11, it is examined whether or not there is an incoming call from the digital communication line. In other words, it is examined whether or not the received message is a setup message. If an incoming call is detected, the communication line control unit 101 informs a reception of setup message to the main controller 107 and the process proceeds to step S12. On the other hand, if no incoming call is detected, the processing for supervising the incoming call detection is continued. At step S12, it is checked whether or not the apparatus is at the power supply state. In the case of the power supply state, the process proceeds to step S13. On the other hand, in case of the power failure state, the process proceeds to step S16.

At step S13, a setting of the set-up switch 110 is checked at the power supply state. If a connected digital communication line is the ISDN 20, the process proceeds to step S14 where a ringing tone of the pattern E as shown in FIG. 6 is generated by the sound resource circuit 104, transmitted to the communication circuit 102, and outputted to the speaker 113. If the connected digital communication line is the extension of the PBX 30, the process proceeds to step S15 where a ringing tone of the pattern F as shown in FIG. 6 is generated by the sound resource circuit 104, transmitted to the communication circuit 102, and outputted to the speaker 113.

At step S16, a setting of the set-up switch 110 is checked at the power failure state. If a connected digital communication line is the ISDN 20, the process proceeds to step S18 where a ringing tone of the pattern H (not shown), which is different from other ringing tones at the power supply state, is generated by the sound resource circuit 104, transmitted to the communication circuit 102, and outputted to the speaker 113. If a connected digital communication line is the extension of the PBX 30, the process proceeds to step S17 where a ringing tone of the pattern G (not shown) which is different from other ringing tones at the power supply state, is generated by the sound resource circuit 104, transmitted to the communication circuit 102, and outputted to the speaker 113.

After the processing at steps S14, S15, S17, and S18, the handset 103 is picked up and communication with the called party is realized.

According to the present embodiment, not only a dial tone/ringing tone in accordance with the type of the connected communication line is outputted when the power is supplied at the power supply state, but also a calling party/called party can be informed of the type of connected communication line when the power supply is shut down. In other words, regardless of the power-supply state, by outputting the dial tone/ringing tone, a caller/receiver can easily distinguish the connected communication network.

[Second Embodiment]

<General Description of the Apparatus (FIG. 7)>

Figure 7:
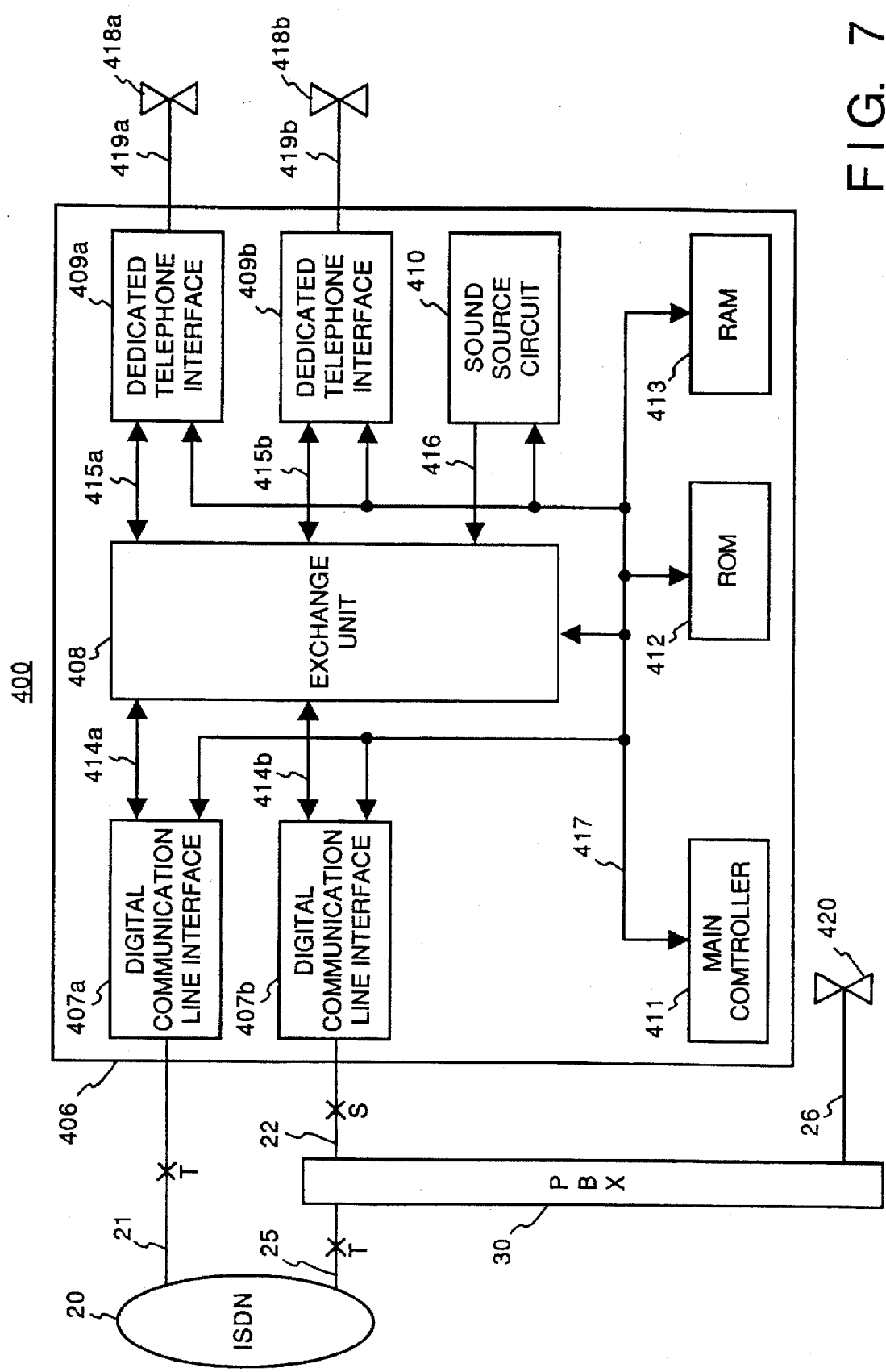
FIG. 7 is a block diagram illustrating a construction of the key telephone apparatus of a second embodiment according to the present invention.

FIG. 7 is a block diagram illustrating a construction of the key telephone system 400 of the second embodiment.

As shown in FIG. 7, in the key telephone system 400, the main unit 406 accommodates the PBX extension 22 conforming to the S reference point interface for the PBX 30 having a digital public communication line 25 as well as a digital public communication line 21 conforming to the T reference point interface for the ISDN 20. The type of communication line can be identified by the setting of the software controlled switch which is provided in the RAM 413 of the main unit 406. The PBX 30 can further connect to extension digital terminals other than the main unit 406 of the key telephone system 400. In the example of FIG. 7, the PBX 30 connects to the telephone apparatus 420 through the extension line 26.

The main unit 406 further comprises digital communication line interfaces 407a, 407b, accommodating the digital public communication line 21 and the PBX extension line 22, exchange unit 408 for exchanging communication paths, sound source circuit 410 for outputting a dial signal, main controller 411 for controlling the overall main unit 406, ROM 412 for storing control programs, RAM 413 for storing various data, dedicated telephone apparatuses 418a, 418b, accommodated as extensions of the key telephone system 400 (hereinafter referred to as "telephones"), having various display functions, and dedicated telephone interfaces 409a, 409b, accommodating the digital communication lines 419a, 419b, from the telephones 418a, 418b.

The main unit 406 further comprises PCM data highways 414a, 414b, between the digital communication line interfaces 407a, 407b, and the exchange unit 408, PCM data highways 415a, 415b, between the dedicated telephone interfaces 409a, 409b and exchange unit 408, PCM data highway 416 between the sound source circuit 410 and exchange unit 408, and control bus 417.

In the above construction, if the telephone apparatus 418a/418b seizes the digital public communication line 21 or PBX extension 22 when the handset is picked up, the main controller 411 outputs a dial tone data generated by the sound source circuit 410 to the dedicated telephone interface 409a/409b, and a ringing tone is outputted from the telephone 418a/418b. On the other hand, if there is the incoming call from the ISDN 20/PBX 30, the main controller 411 transmits the ringing tone data generated by the sound source 410 to the dedicated telephone interface 409a/409b, and outputs the ringing tone from the telephone 418a/418b.

<Processing for Dial Tone Output (FIG. 8)>

The processing for dial tone output at the outgoing call and ringing tone output at the incoming call is now described.

Figure 8:
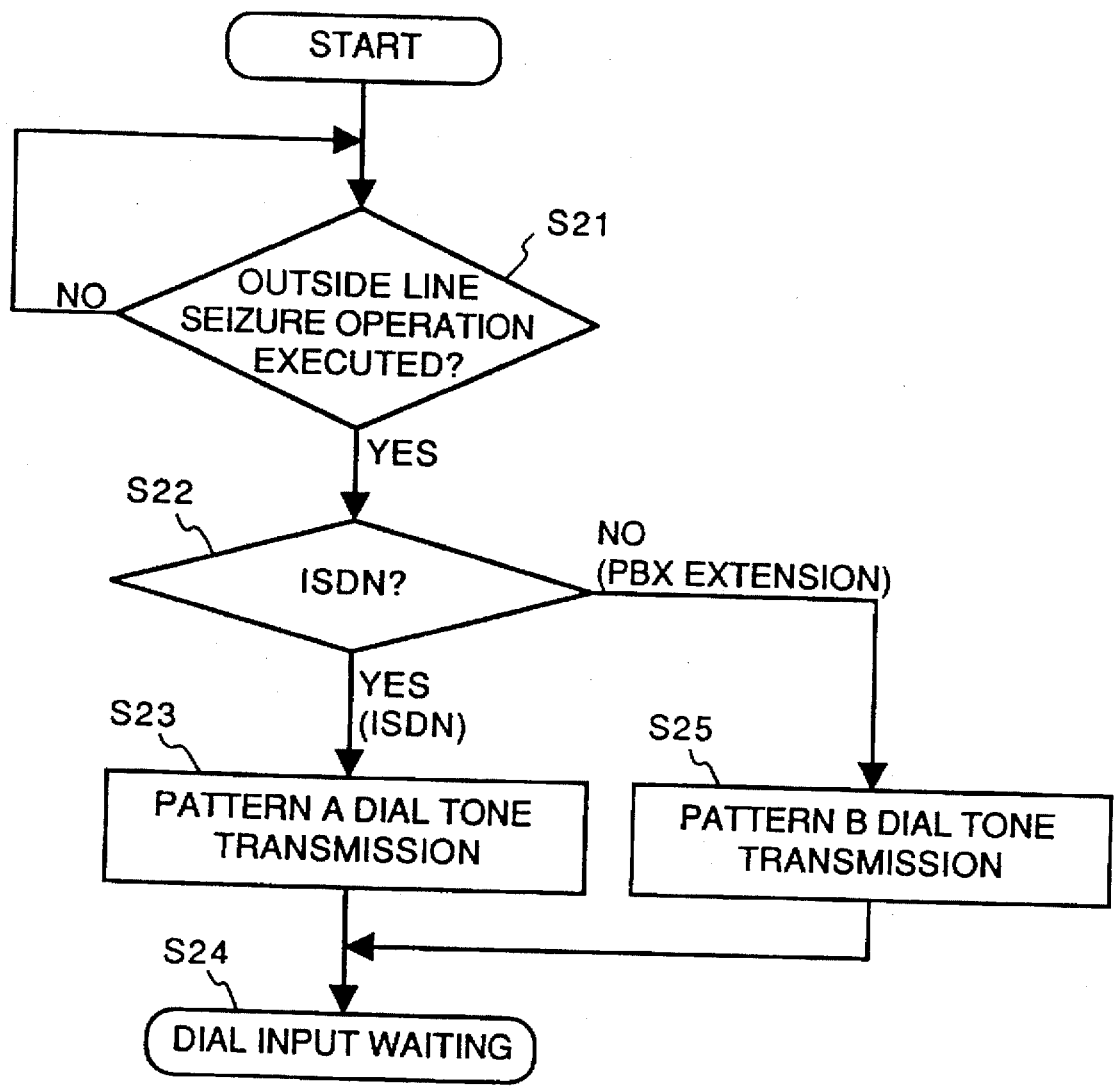
FIG. 8 is a flowchart illustrating an operation for dial tone selection when an outgoing call is made from the key telephone apparatus of the second embodiment.

FIG. 8 is a flowchart illustrating an operation for dial tone selection when an outgoing call is made from the key telephone system 400. In the description below, it is assumed that the main controller 411 is in a wait state for the outside line seizure operation.

At step S21, it is examined whether or not the outside line seizure operation is executed by the outgoing call operation of the telephone apparatus 418a/418b. If the execution of the operation is detected (e.g. an outgoing call using the digital public communication line 21), it is informed of the main controller 411 that the outside line seizure operation has been executed in the dedicated telephone apparatus interface 409a/409b or telephone 418a/418b. The process then proceeds to step S22, while if the execution is not detected, the seizure operation continues to be supervised.

At step S22, it is examined whether the seized communication line is the digital public communication line 21 or PBX extension 22. This processing is executed by the main controller 411 which is informed of the execution of the outside line seizure operation. If the seized line is the digital public communication line 21, the process proceeds to step S23, while if the PBX extension 22, the process proceeds to step S25.

At step 23, the main controller 411 refers to the setting data of the RAM 413 and outputs a dial tone data, such as the pattern A as shown in FIG. 4, from the sound source circuit 410. The data is transmitted to 20 the telephone 418a/418b via the PCM data highway 415a/415b which connects to the dedicated telephone interface 409a/409b by the exchange unit 408, and the pattern A dial tone is outputted. After that, the process proceeds to step S24 where a dial input is expected.

On the other hand, at step S25, the main controller 411 refers to the setting data of the RAM 413 and outputs a dial tone data, such as the pattern B as shown in FIG. 4, from the sound source circuit 410. This data is different from that of the patten A so as to be distinguishable from the case of the seizure of the digital public communication line 21. The data is transmitted to the telephone 418a/418b by the exchange unit 408 via the PCM highway 415a/415b connecting to the dedicated telephone apparatus interface 409a/409b and the pattern A dial tone is outputted. After that, the process proceeds to step S24.

As described above, a calling party can hear the dial tone of the pattern A if the seized line is the digital communication line 21. If the seized line is the PBX extension 22, the dial tone of the pattern B is heard.

<Processing for Incoming Call Output (FIG. 9)>

Figure 9:
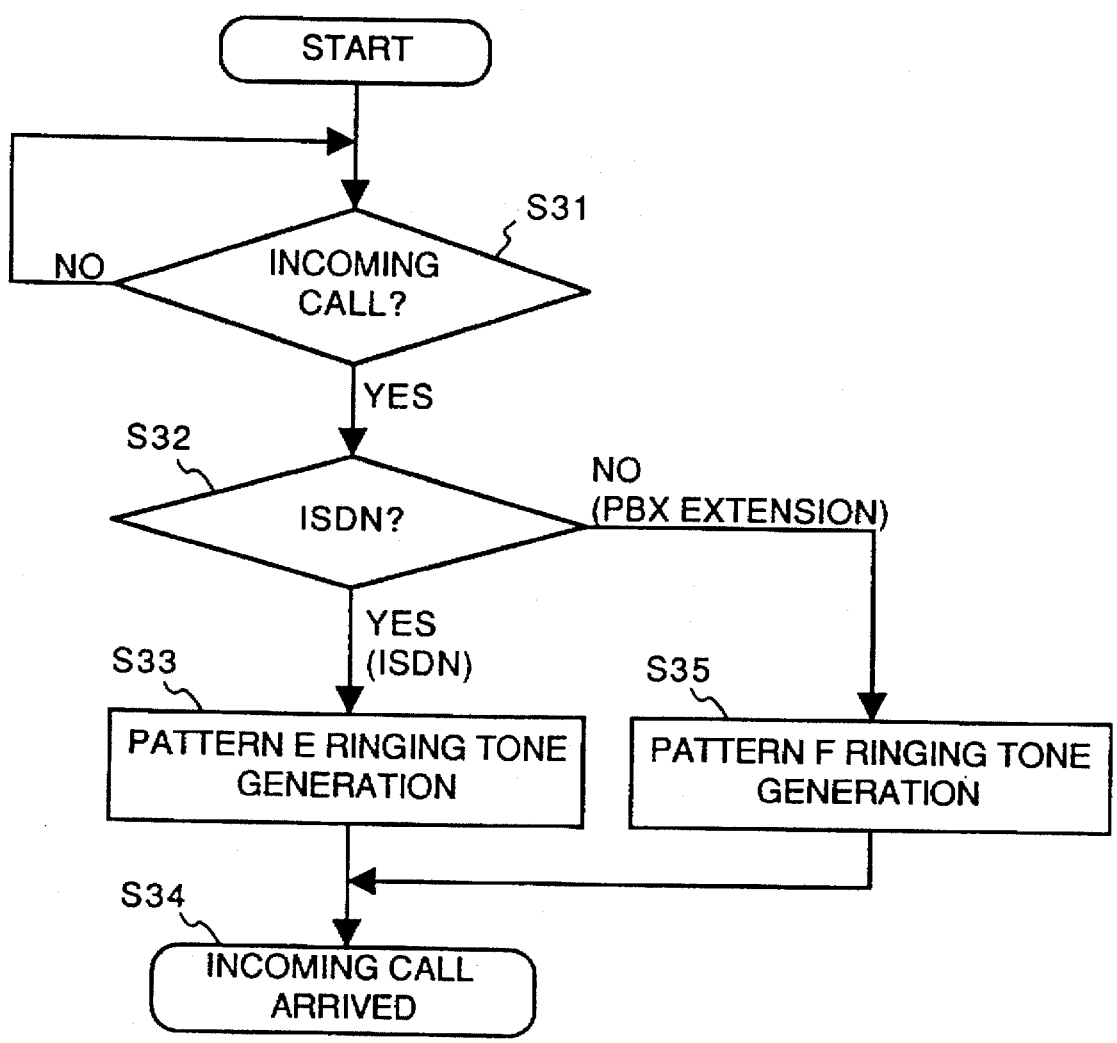
FIG. 9 is a flowchart illustrating an operation for ringing tone selection when there is an incoming call to the key telephone apparatus of the second embodiment.

FIG. 9 is a flowchart illustrating an operation for a ringing tone selection when there is an incoming call to the key telephone apparatus. In the below description, it is assumed that the main controller 411 is in a waiting state for an incoming call from the digital communication network.

At step S31, it is examined whether or not there is an incoming call. In other words, it is examined whether or not the received message is a setup message. If an incoming call is detected (e.g. an incoming call from the digital communication line 21), the digital communication line interface 407a/407b informs the reception of the setup message to the main controller 411, and the process proceeds to step S32. If no incoming call is detected, the process is repeated until an incoming call is detected.

At step S32, it is examined whether the incoming call is from the digital public communication line 21 or the PBX extension 22. This processing is executed by the main controller 411 which is informed of the reception of the setup message. If the communication line of the incoming call is the digital communication line 21, the processing proceeds to step S33. On the other hand, if the communication line is the PBX extension 22, the process proceeds to step S 35.

At step S33, the main controller 411 refers to the setting data of the RAM 413 and generates a ringing tone, such as the pattern E shown in FIG. 6, from the sound source circuit 410. This data is exchanged with the dedicated telephone interface 409a/409b through the PCM data highway 415a/415b by the exchange unit 408 and transmitted to the telephone 418a/418b. In this way, the ringing tone of the pattern E is outputted to the telephone 418a/418b. After that, the process proceeds to step S34 where the incoming call arrives.

On the other hand, at step S35, the main controller 411 refers to the setting data of the RAM 413 and generates another ringing tone data, which is different from that of step S33, such as the pattern E shown in FIG. 6, from the sound source circuit 410. This data is exchanged with the dedicated telephone interface 409a/409b through the PCM data highway 415a/415b by the exchange unit 408 and transmitted to the telephone 418a/418b. In this way, the ringing tone of the pattern F is outputted to the telephone 418a/418b. After that, the process proceeds to step S34.

In the above processing, the telephone 418a/418b generates the ringing tone based upon the type of communication line through which the incoming call has arrived. In case of the digital communication line 21, the ringing tone of the pattern E is generated, while in the case of the PBX extension 22, the ringing tone of the pattern F is generated.

According to the present embodiment, a user of the telephone can hear the dial tone/ringing tone which differs in accordance with the communication line connected at the outgoing call/incoming call.

[Third Embodiment]

In the above embodiments, the dial tone/ringing tone corresponding to the type of the communication line is selected in accordance with the setting data of the set-up switch 110 and RAM 413. In the present embodiment, a ringing tone is changed by identifying the communication line (either outside line or extension line) from the calling party's number included in the setup message at the incoming call.

<Operation Environment and General Description for the Apparatus (FIGS. 10–11)>

Figure 10:
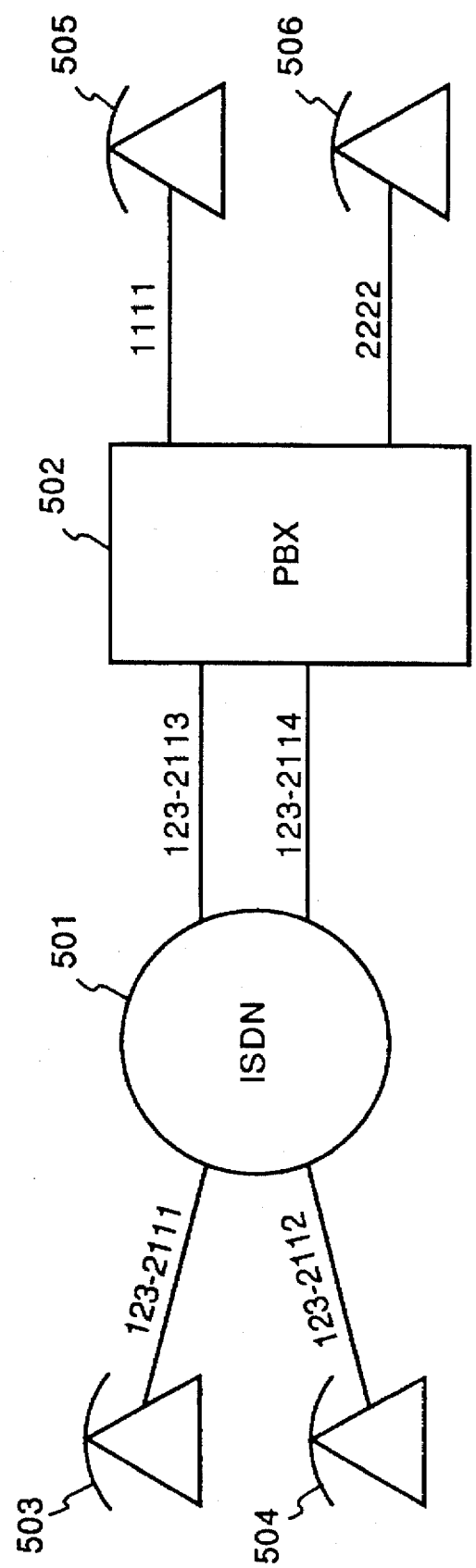
FIG. 10 is a block diagram illustrating an operational environment of the digital telephone apparatus of a third embodiment according to the present invention.

FIG. 10 is a block diagram illustrating the operational environment of the digital telephone apparatus.

In FIG. 10, the digital telephone apparatuses 505 and 506 connect to the PBX 502 which accommodates two outside lines connecting to the ISDN 501. The subscriber's lines of the ISDN 501 connect to the digital telephone apparatuses 503 and 504 respectively.

It is assumed that the subscriber's numbers of the digital telephone apparatuses 503 and 504 are "123-2111" and "123-2112", the subscriber's numbers of the outside lines of the PBX 502 are "123-2113" and "123-2112", and the extension numbers of the digital telephones 505 and 506 are "1111" and "2222".

Figure 11:
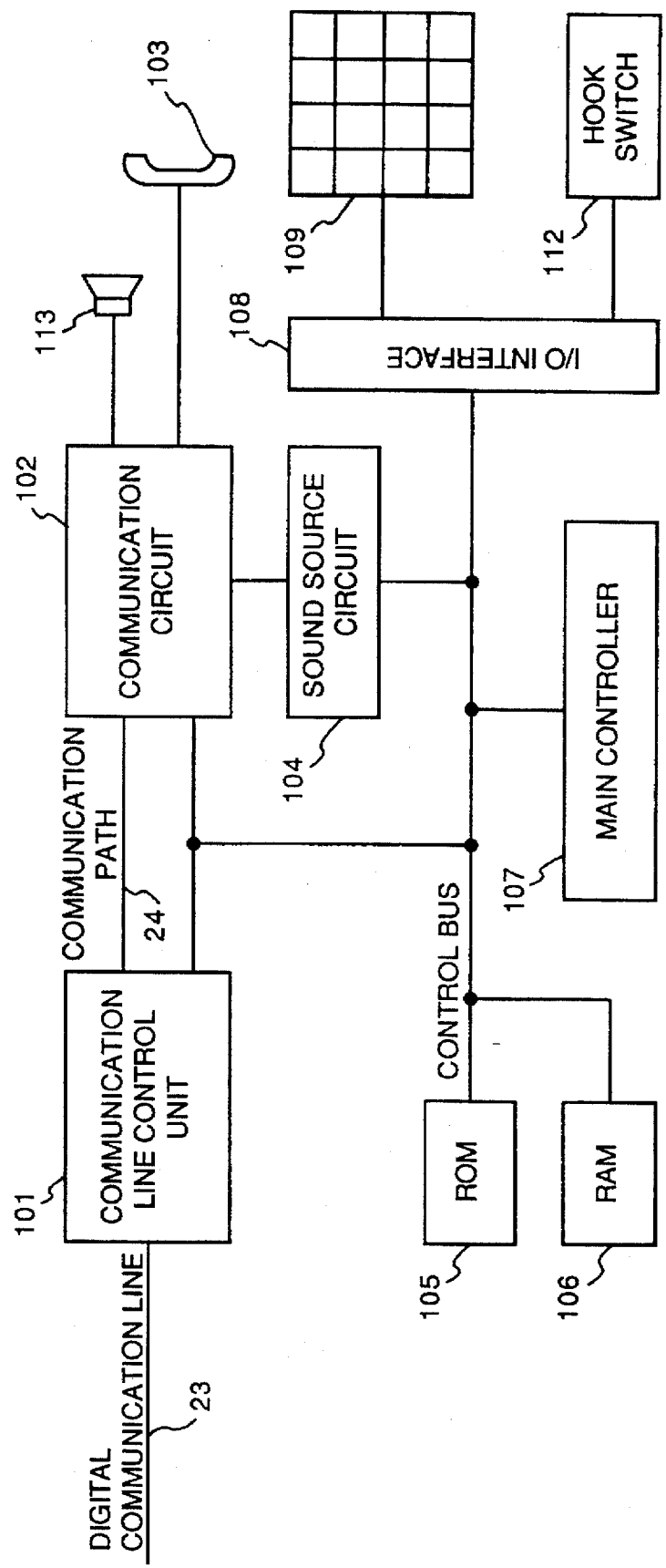
FIG. 11 is a block diagram illustrating a construction of the digital telephone apparatus of the third embodiment.

FIG. 11 is a block diagram illustrating the construction of the digital telephones 505 and 506 which differs from the construction of the digital telephone apparatus 100 of FIG. 1 in the fact that it is lacking the set-up switch 110 and power failure detection circuit 111. Other elements of the digital telephones 505, 506 are the same as those of the digital telephone 100. Thus, the description should be omitted.

In the above construction, when a call is made from the digital telephone apparatus 503 to the subscriber's number "123-2113", the PBX 502 receives the setup message including the number "123-2111" as a calling party's number from the ISDN 501. By the reception of the setup message, the PBX 502 transmits the setup message including the number "0123-2111" to which the trunk access code "0" is added to the digital telephone 506 as a calling party's number.

On the other hand, when a call is made from the digital telephone apparatus 505 accommodated in the extension of the PBX 502 to the digital telephone apparatus 506 also accommodated in the extension of the PBX 502, the PBX 502 transmits the setup message including the number "1111" as a calling party's number to the digital telephone apparatus 506.

In both cases, the user of the digital telephone apparatus 506 can be informed of the incoming call by the ringing tone which is generated when the setup message has been received.

<Processing of Incoming Call Output (FIG. 12)>

Figure 12:
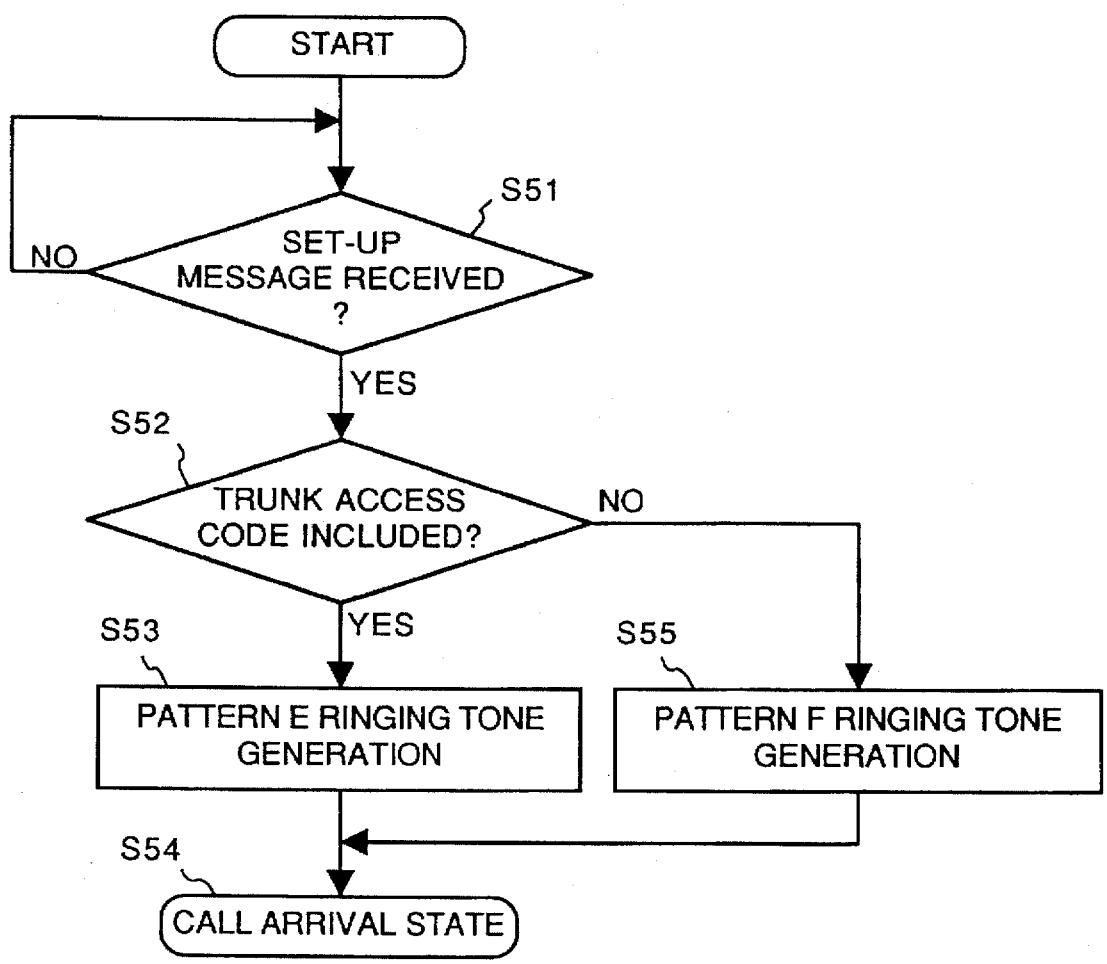
FIG. 12 is a flowchart illustrating an operation for the ringing tone selection when there is an incoming call to the the digital telephone apparatus of the third embodiment.

The procedure for the operation when there is an incoming call in the digital telephone apparatus 506 is described with reference to the flowchart of FIG. 12. The beginning state is that the digital telephone apparatus 506 waits for a setup message.

At step S51, it is examined whether or not a setup message is received. In the case where the message is received, the process proceeds to step S52, while if not, the process is repeated until the message is received.

At step S52, the digital telephone apparatus 506 examines whether or not there is a trunk access code added by the PBX 502 at the head of the calling party's number included in the setup message. If there is a trunk access code, the process proceeds to step S53, while if not, the process proceeds to step S55.

At step S53, a ringing tone is generated by using ringing tone data, such as the pattern E shown in FIG. 6. After that, the process proceeds to step S54. On the other hand, at step S55, another ringing tone is generated by using ringing tone data, such as pattern F, shown in FIG. 6.

According to the present embodiment, the user can listen to the ringing tone which differs based on the type of communication line and easily discriminates if the incoming call is from the outside line of the PBX 502 or the extension line of the PBX 502.

Though a digital telephone apparatus is illustrated as an example of an application of the present invention in the first and third embodiment, this does not impose a limitation upon the invention, which can be applied also to various other terminal apparatuses which can connect to the digital communication network, such as key telephone system, G4 facsimile, or terminal adapter.

In the first embodiment, a dedicated set-up switch to set up dial tones and ringing tones which differ based on the type of connected digital communication line is illustrated as an example of application of the present invention, however, this does not impose a limitation upon the invention. The set-up can be performed by using the key input unit 109.

Furthermore, in the first and third embodiment, the PBX accommodates only the ISDN and the apparatus connected to the extension line of the PBX is a telephone. However, this does not impose a limitation upon the invention. For example, what is accommodated in the extension line of the PBX can be not only the communication line of the ISDN, but also the analog communication line, and the extension terminal of the PBX can be not only the digital telephone apparatus, but also a key telephone system which is different from the key telephone system described in the above embodiment.

Furthermore, in the second embodiment, the communication line which is accommodated in the key telephone system 400 is a digital communication line. However, this does not impose the limitation upon the present invention. For example, an analog communication line can be accommodated, and the extension terminal accommodated in the key telephone system 406 is not limited to the telephone dedicated to the digital communication line.

Still further, in the first embodiment, the dial tone pattern and ringing tone pattern are respectively different at the power supply and power failure. However, the combination of the patterns does not impose a limitation upon the present invention. For example, in a case where the type of communication line differs at the power supply and power failure, the communication line type is considered and a dial tone pattern/ringing tone pattern can be provided.

Still further, the operational environment which is described above does not impose a limitation upon the present invention. For example, it can be arranged that the key telephone system 400 is provided between the ISDN and PBX.

Still further, the patterns of the dial tone and ringing tone, which are described above, do not impose a limitation upon the present invention. For example, it can be arranged that a user can distinguish the type of communication line by changing a frequency of an audible sound other than the patterns or combination of the type of communication line and dial tone/ringing tone can be appropriately changed by a specific setting operation.

Still further, the sound source circuit 410 in the second embodiment can be situated not only in the main unit 406, but also in the telephone 418a/418b or other external units. The speaker for the ringing tone can be replaced by a buzzer in the digital telephone apparatus.

Figure 13:
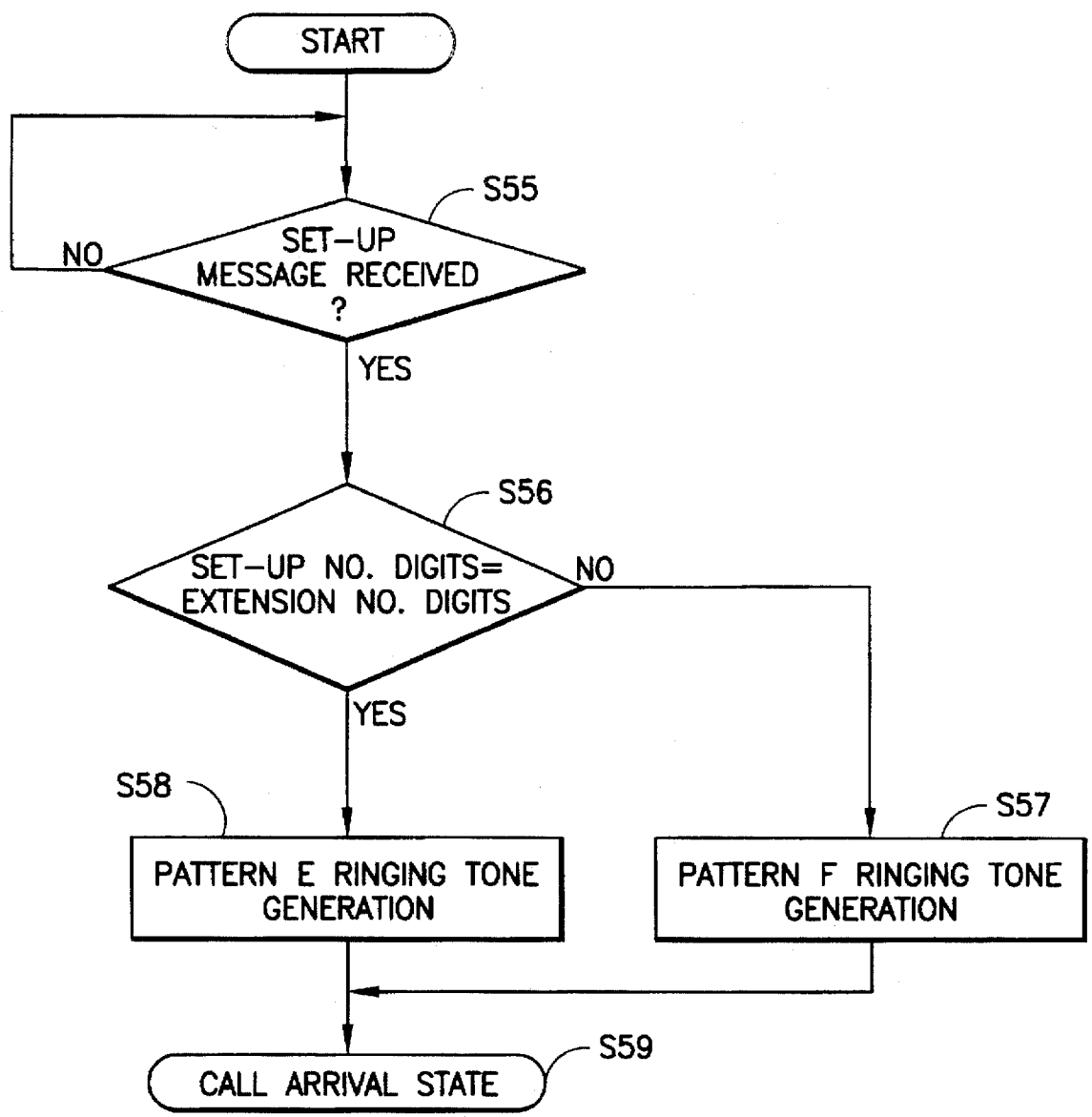
FIG. 13 is a flowchart illustrating an alternative operation for the ringing tone selection when there is an incoming call to the digital telephone apparatus.

Still further, in the third embodiment, a call through an extension is distinguished from a call through an outside line by examining a presence of a trunk access code in the setup message. However, this does not impose a limitation upon the present invention. For example, as shown in FIG. 13, it can be distinguished by setting the number of digits for an extension number of the PBX in the terminal side and, if the number of digits is matched, it is judged that an incoming call is from the extension line of the PBX, while if not, from the outside line of the PBX. Furthermore, in a case where a calling party is identified by the content of the calling party's number other then the above-described methods, it can be arranged that a ringing tone can be selected by that method.

Still further, the exchange unit in the present application includes not only the PBX and key telephone system, but also the LAN (local area network), terminal adapter, or digital terminal apparatus conforming to the S reference point interface.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A call reception method for a communication terminal which is one of a plurality of extension terminals connected to a private branch exchange by a plurality of extension lines respectively indicated by extension numbers each having a first number of digits different from a second number of digits used to indicate outside lines, comprising the steps of:

extracting a calling party's number from a setup message;

determining whether a number of digits of a calling party's number in an incoming call received by said communication terminal corresponds to the first number of digits; and generating an informing signal for informing an operator of said communication terminal as to whether the incoming call originated from one of the extension lines of the private branch exchange or one of the outside lines as a function of only the determination in said determining step and without use of a trunk access code.

2. The method according to claim 1, wherein an audible signal is generated as the informing signal in said generating step.

3. The method according to claim 1, wherein the calling party's number is received from an Integrated Service Digital Network (ISDN) in said determining step.

4. The method of claim 1, wherein the first number of digits of one of the extension numbers of the private branch exchange is less than the second number of digits of one of the outside lines.

5. A method of distinguishing whether an incoming call to an extension terminal of a private branch exchange is from an internal extension line of the private branch exchange, the internal extension line being indicated by an extension number having a first number of digits or is from an outside line indicated by an outside line number having a second number of digits different from the first number of digits, comprising the steps of:

extracting a calling number of the incoming call from a setup message;

determining that the incoming call is from the internal extension line when the number of digits of the calling number matches the first number of digits without use of a trunk access code;

generating a first ringing tone when the incoming call is from the internal extension line;

determining that the incoming call is from the outside line when the number of digits of the calling number fails to match the first number of digits; and generating a second ringing tone when the incoming call is from the outside line.

6. The method of claim 5, wherein the outside line is coupled to an Integrated Service Digital Network (ISDN).

7. The method of claim 5, wherein the first number of digits indicating the internal extension line is less than the second number of digits indicating the outside line.

* * * * *